(12) United States Patent
Baum et al.

(10) Patent No.: US 7,829,046 B2
(45) Date of Patent: Nov. 9, 2010

(54) SCRUBBER FOR REACTIVE GASES

(75) Inventors: Marc M. Baum, Arcadia, CA (US);
John Moss, Los Angeles, CA (US); Xin Zhou, Rancho Cucamonga, CA (US);
Alex Kwan, Chino Hills, CA (US);
Alfred Feitisch, Los Gatos, CA (US);
Xiang Liu, Rancho Cucamonga, CA (US)

(73) Assignee: SpectraSensors, Inc., Rancho Cucamonga, CA (US)

( * ) Notice: Subject to any disclaimer, the term of this patent is extended or adjusted under 35 U.S.C. 154(b) by 0 days.

(21) Appl. No.: 12/202,098

(22) Filed: Aug. 29, 2008

(65) Prior Publication Data

US 2009/0060808 A1     Mar. 5, 2009

Related U.S. Application Data

(60) Provisional application No. 60/968,846, filed on Aug. 29, 2007.

(51) Int. Cl.
*B01D 47/00*     (2006.01)
*B01J 38/12*     (2006.01)

(52) U.S. Cl. .......................................... 423/210; 502/38

(58) Field of Classification Search .................. None
See application file for complete search history.

(56) References Cited

U.S. PATENT DOCUMENTS 5,703,003 A * 12/1997 Siriwardane ................ 502/400
2001/0009884 A1 * 7/2001 Moskovitz et al. .......... 502/263
2004/0159235 A1    8/2004 Marganski
2005/0061147 A1    3/2005 Marganski
2005/0065023 A1 * 3/2005 Deevi et al. ................. 502/304

FOREIGN PATENT DOCUMENTS

| GB | 1471794 A | 4/1977 |
| WO | WO 94/14525 A | 7/1994 |
| WO | WO 96/23726 A | 8/1996 |
| WO | WO 2004/047950 A | 6/2004 |

OTHER PUBLICATIONS

Li Kuo-Tseng and Cheng, Wen-Da. "Selective Oxidation of Hyrogen Sulfide over Bi-Mo catalyst". Applied Catalysis A: General 142 (1996) 315-326.*

* cited by examiner

*Primary Examiner*—Melvin C Mayes
*Assistant Examiner*—Sheng Han
(74) *Attorney, Agent, or Firm*—Mintz, Levin, Cohn, Ferris, Glovsky and Popeo, P.C.

(57) ABSTRACT

Scrubber media for reactive gases, that can include but are not necessarily limited to hydrogen chloride (HCl), hydrogen sulfide ($H_2S$), hydrogen fluoride (HF), and ammonia ($NH_3$), can include reactive particles, potentially as small as nano-scale, that can optionally be suspended on macro-scale carrier particles. Reactive gases can be converted to non-volatile compounds by being passed through a bed of such scrubber media. Such scrubber media can be used to remove reactive gases from gas mixtures. Potential applications include differential absorption spectroscopy, air pollutant emission controls, and the like. Methods of preparing scrubber media are also described.

18 Claims, 5 Drawing Sheets

SCRUBBER FOR REACTIVE GASES

CROSS-REFERENCE TO RELATED APPLICATIONS

Figure 1:
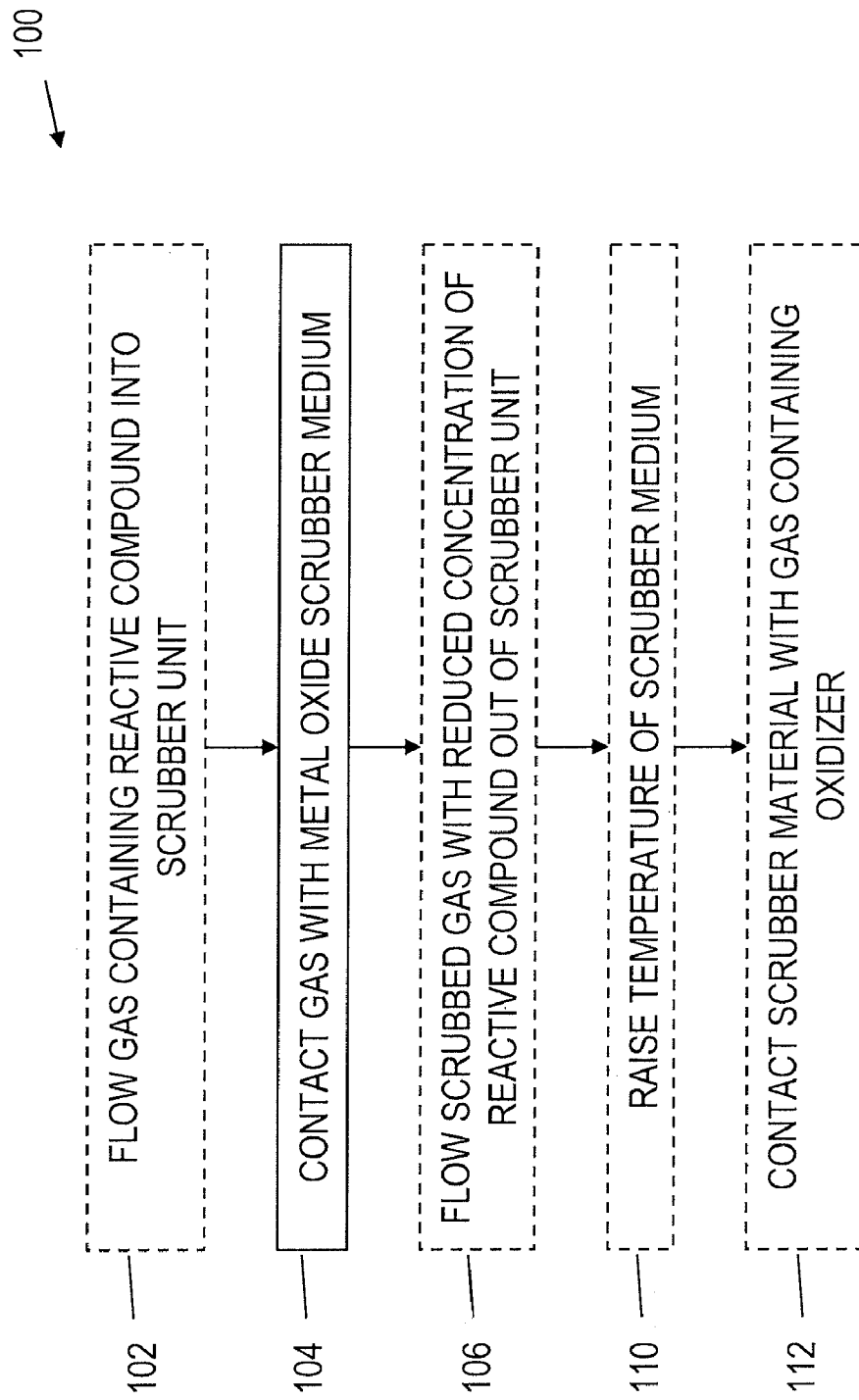

This application claims the benefit of U.S. provisional patent application Ser. No. 60/968,846, filed on Aug. 29, 2007 and entitled "Scrubber for Reactive Gases" which is incorporated by reference herein in its entirety.

TECHNICAL FIELD

The subject matter disclosed herein relates to scrubbing of reactive gases from gas streams.

BACKGROUND

Selective and efficient removal of reactive gases such as hydrogen sulfide ($H_2S$), hydrogen chloride (HCl), ammonia ($NH_3$) and the like from gas streams can present difficulties, particularly in gas analyzer applications that can require removal of such compounds to levels which are practically undetectable by the gas analyzer. A mixture of cupric carbonate dibasic, magnesium sulfate heptahydrate, and asbestos-free talc can be used as a reactive scrubbing medium for removal of $H_2S$ from a gas stream. Alternatively, a potassium permanganate mixture supported on alumina granules can be used as a solid scrubber. Such approaches generally do not selectively remove target compounds such as $H_2S$ with desirable efficiencies, can generate unwanted reaction byproducts, can allow detectable amounts of the target gases to pass through, can cause undesirable fluidization of the media and/or excessive temperature increases (permanganate), can result in migration of the media from the condensed phase into the gas stream as either entrained aerosols or particles or as evaporated gases, and/or can entail the use of expensive media and/or equipment. In addition, low removal efficiencies of these materials can prompt the use of excessive amounts of scrubber material. This can increase scrubber cost and size beyond practically acceptable limits and/or cause unacceptably low scrubber field life and/or unacceptable gas flow back pressure. Other approaches can include use of a charcoal or activated carbon scrubbing media. However, these materials have an affinity for hydrocarbons, which may constitute a desired component of the gas stream. Large scale $H_2S$ removal in natural gas can also be accomplished using amine solutions. In process chemical applications, this gas can be removed using a bed of zinc oxide (ZnO) operating at an elevated temperature. Both types of processes can nonetheless leave low ppm level $H_2S$ concentrations in the respective gas streams.

SUMMARY

In one aspect, a method includes contacting a gas mixture that includes a reactive compound and one or more background compounds with a scrubber medium. The scrubber medium includes reactive particles that react with the reactive compound to convert the reactive compound to one or more non-volatile products, the reactive compound can include a gas-phase acid or a gas-phase base.

In an interrelated implementation, an apparatus includes a scrubber unit that contains an inner volume and that includes an inlet to connect to an incoming gas flow of gas and an outlet via which gas in the inner volume is purged. A scrubber material that includes reactive particles of a material that reacts with a gas-phase reactive compound to form a non-volatile surface product at a scrubber temperature below approximately 100° C., the scrubber material is disposed in the inner volume of the scrubber unit.

An apparatus can optionally include at least one spectroscopic sample cell, a light source positioned to project light into the spectroscopic sample cell, a detector positioned to quantify absorption of the light in the at least one sample cell, tubing and/or valving to direct a first sample of a gas mixture from the scrubber unit to the at least one sample cell to determine a background absorption measurement with a reactive gas removed from the gas sample volume, and a processor that receives data for the first sample and the second sample from the detector and that performs a differential absorption calculation based on the data to determine a concentration of the reactive compound in the gas mixture absent background interference from other compounds in the gas mixture. The tubing and/or valving can also direct a second sample of the gas mixture to the at least one sample cell such that the second sample does not pass through the scrubber unit and thus does not have the reactive gas removed.

In other optional variations, the contacting can be maintained for at least approximately one second. The scrubber medium can be maintained at a temperature below approximately 100° C. or alternatively in a temperature range of approximately −20° C. to 85° C. or alternatively in a temperature range of approximately −20° C. to 60° C. The method can optionally further include flowing a first volume of the gas mixture into a scrubber unit that contains the scrubbing medium and flowing the first volume out of the scrubber unit after a concentration of the reactive compound has been substantially reduced relative to that in the gas mixture. The gas mixture flow can optionally be at a flow rate that is in a range of approximately 0.1 to 6 SLPM.

The reactive compound can be a gas-phase acid and the scrubber material can include metal oxide particles with first aerodynamic diameters of less than approximately 250 nm or alternatively of less than approximately 100 nm. The metal oxide particles can undergo one or more surface reactions with the gas-phase acid to form one or more metal-anion complexes on the metal oxide particle surfaces. The reactive compound can include one or more of hydrogen sulfide, hydrogen chloride, hydrogen fluoride and ammonia. The scrubber medium can optionally further include carrier particles that are substantially inert relative to the one or more background compounds. The metal oxide particles can be impregnated into or onto the carrier particles. The metal oxide can optionally be selected from a group consisting of CuO, ZnO, potassium permanganate, and alkaline copper(II) carbonate [$CuCO_3.Cu(OH)_2$]. The carrier particles can optionally have second aerodynamic diameters in a range of approximately 10 to 250 microns or alternatively in a range of 40 to 250 microns. In a further optional process, the scrubber medium can be heated to a temperature above approximately 150° C. and an oxidizing gas stream can be passed through the scrubber medium to regenerate the scrubber medium by converting the surface metal-anion complexes to one or more volatile species. The reactive particles can optionally include one or more acids that react with the gas-phase reactive compound that includes a base.

In another interrelated implementation, a method of making a scrubber medium includes combining metal oxide nanoparticles having first aerodynamic diameters of less than approximately 250 nm with carrier particles having second aerodynamic diameters that are larger than the first aerodynamic diameters to form a scrubber medium mixture, and agitating the scrubber medium mixture for a period sufficient to cause the metal oxide nanoparticles to become impregnated into or onto the carrier particles. In optional variations of this implementation, a slurry of the scrubber medium mixture and a solvent can be formed prior to the agitating. The slurry can optionally be heated to drive off the solvent after the agitating. The second aerodynamic diameters can be in a range of approximately 10 to 250 microns or alternatively in a range of approximately 40 to 250 microns.

In another interrelated implementation a composition includes metal oxide particles having aerodynamic diameters of less than approximately 250 nm. The metal oxide particles react at a temperature of less than approximately 100° C. with one or more acid gases to form a metal-anion product on a metal oxide particle surface. The composition can also include carrier particles having aerodynamic diameters in a range of approximately 10 to 250 microns or alternatively in a range of approximately 40 to 250 microns. The carrier particles include a porous material that is impregnated with the metal oxide particles. The metal-anion product is optionally convertible to a volatile compound at a temperature above 150° C. in the presence of an oxidizing gas. The metal oxide particles can optionally be adsorbed to the carrier particles by electrostatic or van der Waals forces.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings, FIG. 1 is a process flow diagram illustrating a method for reducing the concentration of a reactive compound in a gas mixture;

FIG. 2 is a process flow diagram illustrating a method for analyzing a concentration of a reactive compound in a gas mixture or stream;

FIG. 3 is a process flow diagram illustrating a method for preparing a scrubber medium;

FIG. 4 is a schematic diagram illustrating a spectroscopic analysis system that can be used in conjunction with the currently disclosed subject matter; and FIG. 5 is a schematic diagram illustrating a second spectroscopic analysis system that can be used in conjunction with the currently disclosed subject matter.

DETAILED DESCRIPTION

The currently disclosed subject matter provides, among other potential benefits, apparatuses, systems, methods, techniques and/or articles of manufacture relating to removal or reduction of concentrations of gas-phase reactants, including for example those that can act as chemical bases or chemical acids, potentially including but not limited to $H_2S$, HCl, HF, $NH_3$, and the like, by surface reactions that generate non-volatile and more readily removable products, such as for example solids, adsorbed-phase compounds, liquids, or the like. One or more benefits and/or advantages can be provided potentially including but not limited to removal or substantial reduction in the concentration of a target gas without generating unwanted compounds, without causing fluidization of a mobile scrubber medium or media, and without migration of the scrubber medium into a flowing gas stream. Other potential benefits can include extended operational lifetime without a requirement for frequent or periodic maintenance or replacement. The scrubbing media used can be quite inexpensive and easy to manufacture and prepare for use. Another advantage can include efficient removal of respective target gases at low temperatures of less than approximately 100° C. or alternatively less than approximately 85° C. or in a range of approximately −20° C. to 60° C. Furthermore, regeneration, or re-release of the respective reactive trace compound and recreation of the scrubbing media might be readily accomplished in a suitable high temperature atmosphere. Use of a solid-state scrubber material can also avoid or reduce the occurrence of undesirable interactions between the scrubber material and materials used in the construction of a scrubber device and/or other components of a system that might be susceptible to corrosion or other unwanted chemical reactions that can occur with commonly used wet scrubber materials.

Nanoparticulate metal oxides represent a highly reactive class of compounds that can efficiently and selectively remove acidic trace (for example less than approximately 1,000 ppmv) components of a gaseous stream. Nanoparticles are generally defined as particles with an aerodynamic diameter ($d_p$—defined below) of less than approximately 100 nm or alternatively with $d_p$ less than approximately 250 nm. The nano-scale of these materials can enable the reactions to be carried out efficiently at room temperature, rather than at the elevated temperatures that may be necessary for sufficiently fast reactions on bulk-phase materials. The availability of low temperature reactive materials presents a significant advance, especially in applications where the use of elevated temperatures can present a concern with regards to safety or other operational factors. In addition, the reduced complexity of a scrubber that does not require temperature control may be desirable in some applications.

According to one implementation, which is illustrated in the process flow chart 100 of FIG. 1, reactive compounds, such as for example $H_2S$, HCl, HF, or $NH_3$, can be selectively removed from a gas stream or mixture that contains one or more main or background components and one or more reactive compounds. At 104, the gas is contacted with a scrubber medium such as those described below. This contacting can be accomplished optionally by first flowing the gas into a scrubber unit that contains the scrubber medium at 102. At 106, the scrubbed gas, having a reduced concentration of the reactive compound can be removed from the scrubber unit. The scrubbing medium can optionally be a mixture of more than one media. The contact period at 104 can advantageously be in the range of approximately 0.1 second to 10 seconds or alternatively in the range of approximately 1 second to 10 seconds. The contact period can be achieved through a batch process or alternatively through a flow reactor arrangement such as a plug flow or continuous flow stirred tank reactor. The medium can optionally include nano-scale reactant particles, or alternatively such nano-scale reactant particles adhered to macro-scale carrier particles, such as for example sand, alumina, silica, halloysite nanoclay, or the like. The reactant particles can in one example include one or more metal oxide compounds. Metal oxide-based scrubber media have been found to be effective in removing reactive gases that behave as Lewis acids. In other implementations, ammonia or other Lewis base gas-phase compounds can be scrubbed from the gas phase using a scrubber medium that includes particles of a solid acid, such as for example phosphorous acid ($H_3PO_3$). These acid particles can optionally have aerodynamic diameters in a range of approximately 10 nm to 1 cm. The solid phase acid can be used as discrete homogeneous particles or alternatively as small particles coated on larger carrier particles such as for the metal oxide particles.

If two or more compounds are used with carrier particles, one or more metal oxide nanoparticles and/or particles of solid acid can be provided as a heterogeneous coating on some fraction (from 0% to 100%) of the carrier particles or alternatively as a homogenous coating on some fraction of the carrier particles. The scrubber medium could also optionally include a mixture of solid-phase acid particles for removal of ammonia and other basic compounds and metal oxide nanoparticles, optionally supported on carrier particles, for removal of acidic compounds. In some variations, the reactive particles can be adhered to the carrier particles by means of electrostatic interactions or van der Waals forces.

At 110 and 112 in FIG. 1, the scrubber medium can optionally be regenerated. This process can include raising the temperature of the scrubber medium at 110. the elevated temperature can optionally be above approximately 150° C., in a range of approximately 150° C. to 800° C. or in a range of approximately 150° C. to 250° C. At 112, an oxidizing gas is contacted with the scrubber medium. During scrubbing of acid gases, metal oxide sites on the metal oxide nano-particles are converted to a metal anion surface compound. For example, for the use of copper oxide (CuO) to scrub hydrogen sulfide ($H_2S$), the following reaction occurs during low temperature operation:

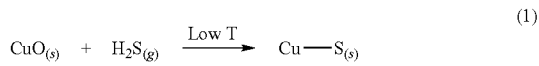
(1)

At elevated temperature in the presence of an oxidizer such as high concentrations of oxygen, this process may be reversed as follows:

(2)

Use of extreme temperatures during the regeneration process can lead to oxidation of the produce gas. For example, the process in equation 2 could lead to formation of sulfur dioxide ($SO_2$) or sulfur trioxide ($SO_3$). Because oxidized sulfur compounds such as $SO_2$ and $SO_3$ are more amenable to removal by wet scrubber techniques than $H_2S$, high temperature regeneration of the scrubber material can be advantageous in some applications.

Figure 2:
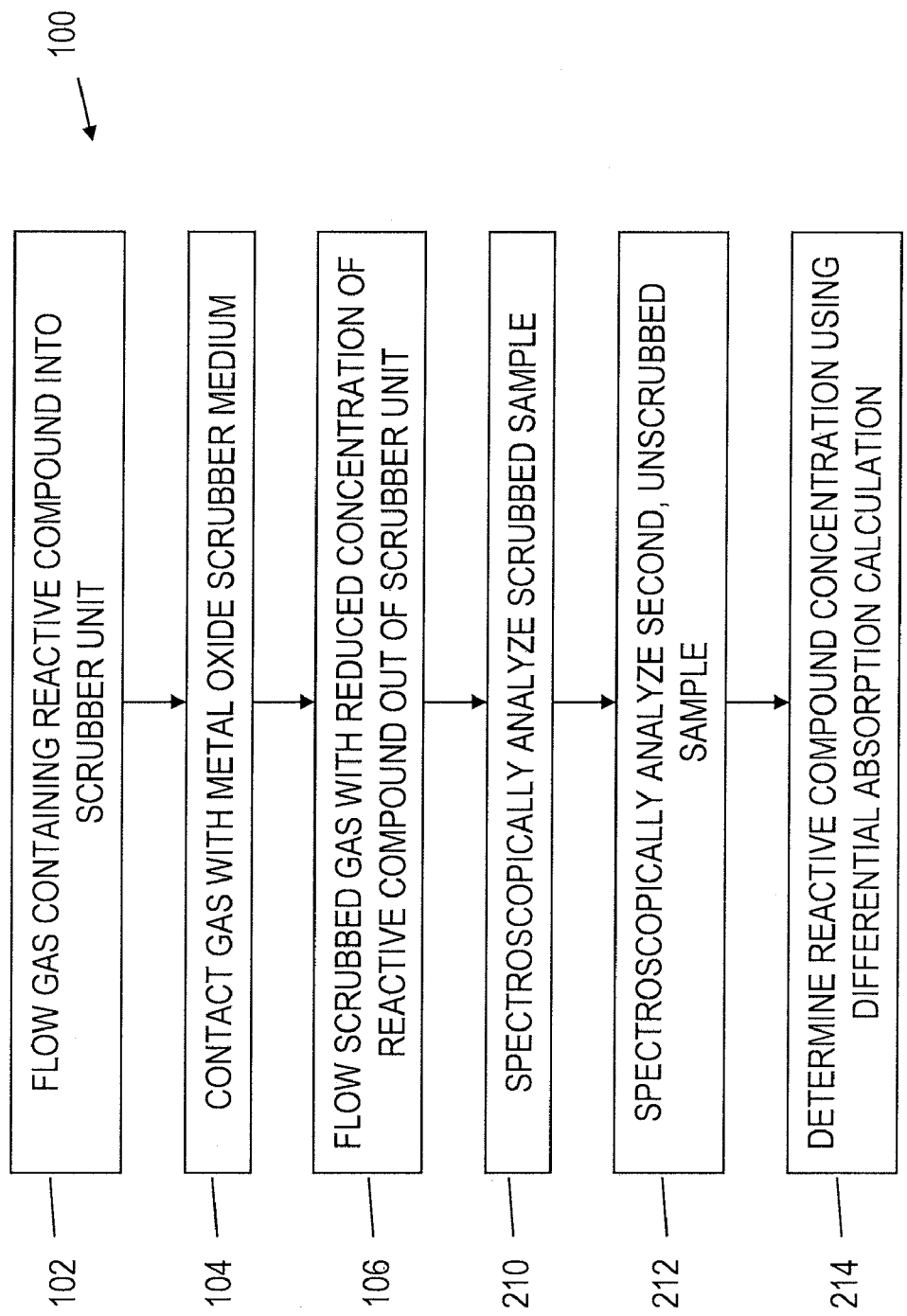

FIG. 2 also shows an optional implementation that includes a method in which the scrubbed gas is used in a differential absorption spectroscopic measurement. In addition to removal or reduction of the concentration of a reactive compound at 102 to 106, at 210, the scrubbed gas can be analyzed spectroscopically to obtain a background absorption spectrum for the gas mixture. A second spectroscopic measurement can be performed at 212 on an unscrubbed sample of the gas mixture. The two spectroscopic measurements are then combined in a differential absorption calculation at 214 to determine the concentration of the reactive compound in the gas mixture. More details on differential absorption measurements for reactive compounds are disclosed in co-pending and co-owned U.S. patent application Ser. No. 12/101,890, the disclosure of which is incorporated by reference herein in its entirety.

In one implementation, nano-scale CuO particles can be used for the removal of $H_2S$ from streams of mixed hydrocarbon, noble gases, air, oxygen, nitrogen, carbon monoxide, carbon dioxide, hydrofluorocarbon, hydrochlorofluorocarbon, and/or hydrochlorocarbon gas streams. Gaseous $H_2S$ can be converted quantitatively or nearly quantitatively to nonvolatile compound(s) at room temperature, thereby removing it from a flowing gas stream, even with scrubber contact times below approximately 1 s. Other nano-scale metal oxides can be used, including but not limited to ZnO; $Fe_3O_4$; and nano-scale mixed metal oxides such as for example one or more of $CuZnFe_2O_4$, NiOCoO, and $NiZnFe_2O_4$. As noted above, these nanoparticles can optionally be suspended upon a macro-scale carrier such as alumina, silica, or similarly inert particles.

By supplying the metal oxide as a surface coating of nanoparticles on significantly larger carrier particles, a high ratio of surface area to volume can be achieved for the metal oxide nanoparticles while maintaining sufficient particle size to avoid or at least minimize suspension of the scrubber particles and potential entrainment in a flowing gas stream. This effect is illustrated below in reference to spherical particles. However, it should be noted that scrubber materials described herein need not be spherical in shape, either for the nanoparticle or for the carrier particles to which nanoparticles are adhered.

References made herein to particle dimensions in terms of a particle diameter or other characteristics of a sphere should be understood as covering both spherical or near-spherical particles and those particles with irregular dimensions. Aerodynamic diameter is a physical property of a particle in a viscous substance such as air. Particles such as those discussed herein can have irregular shapes with actual geometric diameters that are difficult to measure and characterize. Aerodynamic diameter is an expression of a particle's aerodynamic behavior as if it were a perfect sphere with unit-density and diameter equal to the aerodynamic diameter. As such, all references to particle diameter made herein can be read to mean either the actual diameter (for spherical bodies) or the aerodynamic diameter (for non-spherical or other irregularly shaped bodies).

A solid sphere of metal oxide has a volume (V) of approximately $$V = \frac{1}{6}\pi \cdot d_p^3 \quad (3)$$

where $d_p$ is the diameter of the sphere, a mass (M) of $$M = \rho \frac{1}{6}\pi d_p^3 \quad (4)$$

where ρ is the density of the metal oxide, a surface area (SA) of $$SA = \pi d_p^2 \quad (5)$$

and a surface area to mass ratio of $$SA/M = 6/\rho d_p \quad (6)$$

As equation 6 demonstrates, the surface area to mass ratio for a sphere is inversely proportional to the particle diameter. Thus, as $d_p$ drops, more of the metal oxide mass is available at the sphere surface to react with gas-phase reactants because more of the particle mass is on its surface. An additional enhancement of the surface reactivity can occur for some materials such as those discussed herein when the reactant particle size drops to nano-scale. However, the use of very small particles can in some implementations present operational problems, both with entrainment of such spheres in a flowing fluid such as a gas stream and/or with agglomeration of very small particles into larger particles. The use of very small scrubber particles can also lead to undesirable increases in pressure drop for the flowing gas stream.

In general, the tendency of a particle to become entrained in a gas stream flowing vertically upward (opposite to the direction of gravity) can be estimated by comparing the drag force ($F_D$) exerted on the particle by the moving gas with the gravitational force $F_G$ exerted on the particle. The gravitational force is given simply by $$F_G = M \cdot g \quad (7)$$

where g is the acceleration of gravity. By substituting equation 4 into equation 7, it can be shown that $F_G$ is proportional to the third power of the particle diameter ($d_p$) as well as to the density of the material. The drag force, $F_D$, on a particle is a more complicated function that is derived from Stokes Law and can be expressed as $$F_D = \frac{\pi}{8} C_D \cdot \rho \cdot d_p^2 \cdot V_g^2 \quad (8)$$

where $V_g$ is the velocity of the gas stream (the volumetric flow rate divided by the cross sectional area of the conduit through which the gas is flowing) and $C_D$ is an empirically determined drag coefficient. The value of $C_D$ can vary depending on the ratio of inertial and viscous forces in a moving fluid. This ratio is often expressed as the Reynolds number (Re) in fluid mechanics which can be expressed as $$Re = V_g \cdot L / \nu \quad (9)$$

where L is a length characteristic of the system and $\nu$ is the fluid kinematic viscosity (ratio of the density and dynamic viscosity of the fluid). For the purposes of characterizing drag on a particle in a gas stream, the diameter or aerodynamic diameter of the particle ($d_p$) can be used as the characteristic length (L). The kinematic viscosity of a gas depends on the gas composition and temperature. As an example, for air at 25° C., $\nu = 1.56 \times 10^{-5}$ $m^2$ $s^{-1}$. The drag coefficient has been found to vary approximately as some inverse power of the Reynolds number (and therefore as some inverse power of $d_p$) over a range of Reynolds numbers below about 500. As the Reynolds number increases for a given system, the dependency of $C_D$ on Re (and therefore on $d_p$) decreases until $C_D$ approaches a constant. As can be seen from equation 9, the Reynolds number increases with an increase in either L ($d_p$) or $V_g$. As an example, a particle with a 1 mm aerodynamic diameter in a gas stream flowing at 2 m $s^{-1}$ (corresponding to a volumetric flow rate of about 0.4 $m^3$ $s^{-1}$ or 6 L $min^{-1}$ in a circular conduit with a 50 cm diameter) has a Reynolds number of about 130. Reducing the flow rate or the sphere diameter lowers Re proportionally.

Referring again to equation 8, and assuming a constant value for $C_D$ or alternatively an inverse relationship of $C_D$ to the aerodynamic diameter ($d_p$) of a particle, it can be seen that the drag force ($F_D$) on a particle in a moving gas stream is proportional to the square or some smaller power of the aerodynamic diameter ($d_p$). As such, for a particle of a material with a given density, the drag force that tends to promote entrainment or fluidization of the particle into a moving gas stream decreases more slowly with decreasing aerodynamic diameter than does the gravitational force that tends to promote settling out of the particle. Thus, while reducing the aerodynamic diameter of particles of a scrubbing medium will generally increase the available surface area of the medium to react with reactive gases in the gas stream, this technique can also potentially promote the undesirable side-effect of making the particles more readily suspendable in the gas stream. In various implementations, gas flow through a scrubber unit can be downward (in the direction of gravity), and/or one or more filters, glass wool plugs, or other comparable materials can be provided to hold the scrubber media in place. A scrubber containing a scrubbing medium as described herein can be arranged with a flow direction in any orientation from gas flow directly up (against gravity) to directly down (with gravity) and all angles between.

Use of a carrier medium for the nanoparticles can be a beneficial approach to the issue of potential nanoparticle entrainment in the gas stream being treated. In one implementation, which is illustrated in the process flow chart 300 of FIG. 3, carrier particles of alumina, silica, or some other porous, relatively high surface area material can be impregnated with nanoparticles. At 302, the impregnation process can include combining metal oxide nanoparticles with larger particles of a carrier medium. At 306, the mixture is agitated, such as for example by shaking in a sealed container, for a sufficient time to allow impregnation to occur. For a dry process, the shaking can be performed for more than one minute, or alternatively for more than approximately 5 minutes. Optionally, impregnation can be performed using a wet deposition method in which an aqueous or alcoholic slurry of the nanoparticles and their carrier is evaporated to dryness under reduced pressure. In this variation, at 304 a slurry of the nanoparticles and the carrier particles is formed. The mixture of nanoparticles and carrier particles can optionally be heated at 310. This heating can optionally be continued at 312 for a period that is sufficient to drive off the liquid portion of the slurry if a wet impregnation method is used.

In one example, alumina particles can be added to a CuO nanopowder in a plastic or other container and shaken for a period of time. Alumina added to a CuO nanopowder and shaken together for more than one minute in a container is one example of this technique. In another variation, an aqueous slurry of $Fe_3O_4$ nanoparticles and silica can be slowly heated for several hours to remove the liquid is one example of such a wet deposition technique. A wet deposition technique may result in a more even coating of the carrier particle surfaces with the nanoparticles. Some agglomeration of the nanoparticles could occur in solution. However, small clusters of nanoparticles may provide additional surface area with similar reactivity to unagglomerated nanoparticles. An additional potential benefit of wet deposition techniques could be in some examples the creation a stronger interaction between the deposited nanoparticles and the carrier particles, which could have beneficial effects in reactivity as the carrier particle can serve as a sink and/or a source of spare electrons for oxidation-reduction reactions that occur during conversion of gas-phase reactive gases to non-volatile compounds such as salts.

Carrier particle material or materials that are inert or approximately inert to the main components of the gas stream to be treated can be used to avoid reactions with, adsorption to, or absorption of these main components on or in the carrier particles. Carrier particles used as described herein can be in an aerodynamic diameter range of approximately 1 to 10,000

µm or alternatively in an aerodynamic particle diameter range of approximately 10 to 10,000 µm. In some variations, the carrier particles can have aerodynamic diameters in a range of about 10 to 250 µm (corresponding to a 60-325 mesh separation) or alternatively in a range of about 40 to 250 microns. In some variations, the mass ratio of metal oxide to carrier particles can be approximately 1 to 3 such that the scrubber medium is approximately 25% metal oxide by mass. In other variations, the mass ratio of metal oxide to carrier particles can be in the range of approximately 20% to 30%, in the range of approximately 15% to 35%, or in the range of approximately 1% to 100%.

The high surface area coverage of the metal oxide reactant particles on the carrier particles can provide a substantially larger number of reaction sites than might otherwise be possible with larger reactant particles adhered to carrier particles. The large number of reaction sites can promote very high efficiency of target compound removal and faster reaction kinetics. In this manner, less metal oxide is required to remove a specific amount of target compound than would be possible with larger metal oxide particles. Additionally, a smaller total volume of the scrubber medium or media can be used, thereby reducing the size and expense of the scrubber portion of a system. Other possible utilizations of the current subject matter can include but are not limited to removal of target compounds from gas streams that are not connected with a detection system, capture of target compounds from a chemical reactor, or as a screen to prevent compound migration from one container to another.

Using CuO nano-scale particles, in particular when these particles are suspended upon macro-scale carrier particles of alumina, silica or similar relatively inert, high surface area materials, has demonstrated high efficiency for selectively removing gaseous, acidic trace compounds such as $H_2S$, HF, or HCl, at or near room temperature or other similarly mild reaction temperatures, from streams of mixed hydrocarbons, air, oxygen, nitrogen, carbon monoxide, carbon dioxide, hydrofluorocarbons, hydrochlorofluorocarbons, and/or hydrochlorocarbons. The scrubber materials described herein can optionally be used in a range of approximately −20° C. to 60° C., in a range of approximately 0° C. to 40° C., or alternatively at temperatures below approximately 85° C., or alternatively below approximately 100° C. Removal efficiencies achieved with nano-scale CuO can be substantially higher than those demonstrated with typical particle sizes of various commercially available materials, including standard size CuO, ZnO, potassium permanganate, and alkaline copper(II) carbonate [$CuCO_3 \cdot Cu(OH)_2$], which are capable of creating non volatile sulfur salts by reaction with gas-phase $H_2S$, chloride salts from exposure to HCl, and/or fluoride salts from exposure to HF. Excellent removal efficiencies also have been achieved with alkaline carrier particles, such as for example basic aluminum oxide carrier particles. Higher removal efficiencies can translate into extended scrubber field operating lifetimes, lower overall lifetime cost, lower scrubber material cost, and higher detection sensitivity when the scrubbers are used in conjunction with sensitive analytical equipment such as for example tunable diode laser spectrometers.

Removal of a target compound can optionally be accomplished at room temperature, without need for heating, and without excessive temperature increase of the gas stream (such as for example due to a strongly exothermic chemical reaction), without generating other unwanted compounds, without causing unwanted fluidization of the media, without altering the background gas stream (except for selective removal of the target trace compound), and without migration of the scrubbing media or medium into the gas stream.

The current subject matter can in one variation be employed in a system configured to detect the presence or concentration of the target compound for which the scrubber material is designed or with a gas stream that is intended to have low amounts of the target compound. Such scrubbers can beneficially be in the range of approximately 1 mm to 10 m long or longer and can have cross sectional areas in a range of approximately 1 $mm^2$ to 10,000 $mm^2$ or larger. Flow rates can be tailored as necessary to account for application-specific flow requirements, fluid dynamics of the gas stream, scrubber particle size, acceptable pressure drops, and the like. In one example, the current subject matter can be used in a scrubber canister that is approximately 6.5 inches in length and approximately 1.87 inches in inner diameter (cross sectional area of about 18.3 $cm^2$) and that contains an approximately 5.2 inch deep bed of nano-scale CuO particles on alumina carrier particles. In such a scrubber, a volumetric flow rate in the range of approximately 0.1 to 6 standard liters per minute (slpm) or alternatively in a range of approximately 1 to 6 slpm of a gas having a $H_2S$ concentration in the range of approximately 1 to 3000 ppm or alternatively in a range of approximately 1 to 500 ppm or alternatively in a range of approximately 1 to 300 ppm or alternatively in a range of approximately 0.1 to 50 ppm can be processed to produce an output flow with a $H_2S$ concentration reduction of at least a factor of 10. Greater reductions in gas-phase reactant gas concentrations are possible with increased contact times with the scrubber medium, which can be accomplished by varying the cross sectional area through which gas flows, increasing the depth of the scrubber medium bed, or by reducing the volumetric flow rate through the bed.

The scrubber medium or media can optionally be contained within a Pyrex, fused silica. Plexiglas, or stainless steel tube that includes appropriate filters and fittings to allow for easy connection to a system, such as for example a system for detecting the presence/absence of the target compound or a system for removing the target compound. Different volumetric gas flows are possible depending on the application in which the current subject matter is used. Higher gas flow rates can be designed for by expanding the cross sectional area of the scrubber and/or by increasing the size of the carrier particles to reduce the chances of aerodynamic entrainment in light of the discussion of particle size effects provided herein.

Figure 3:
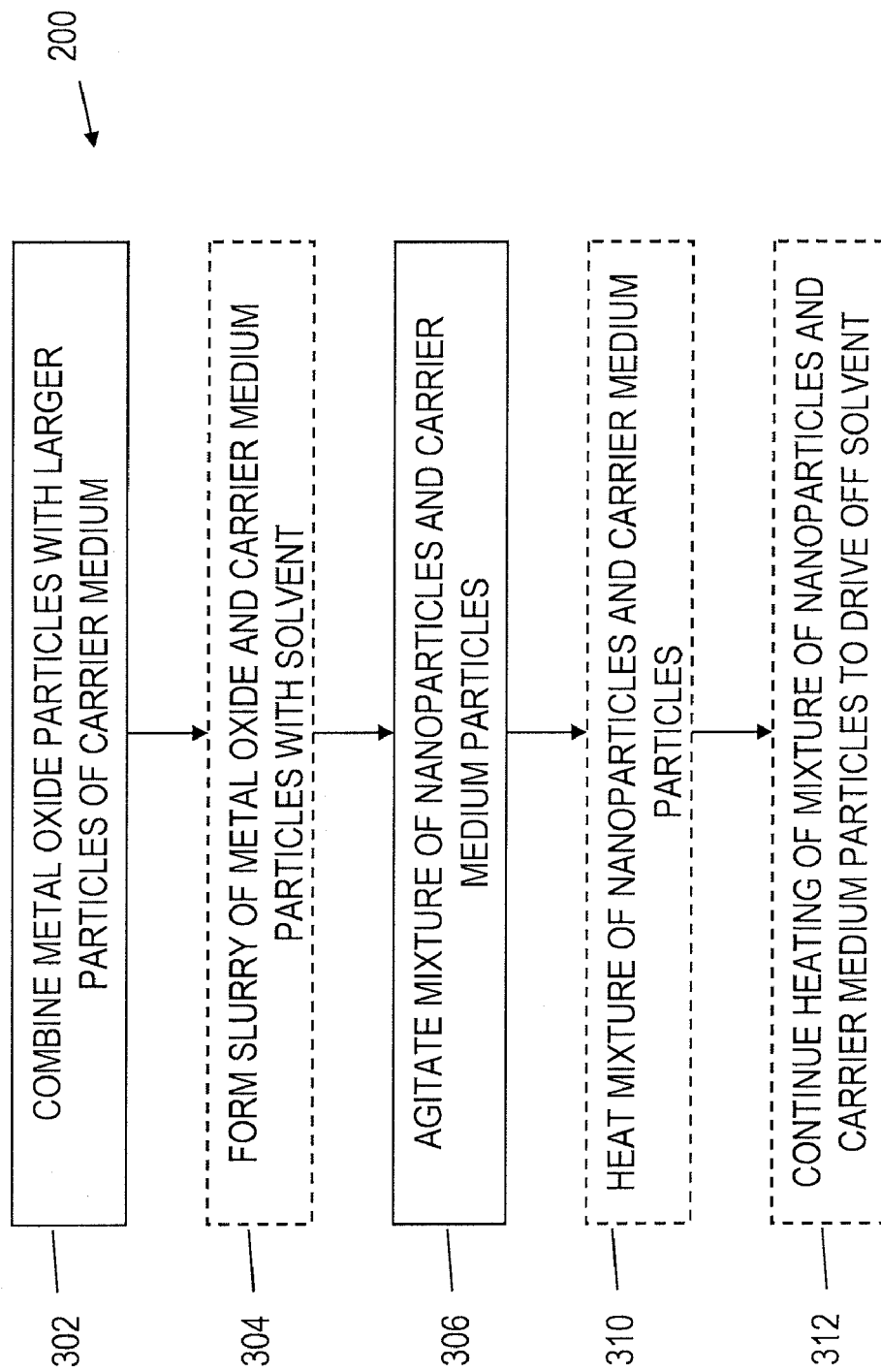
Figure 4:
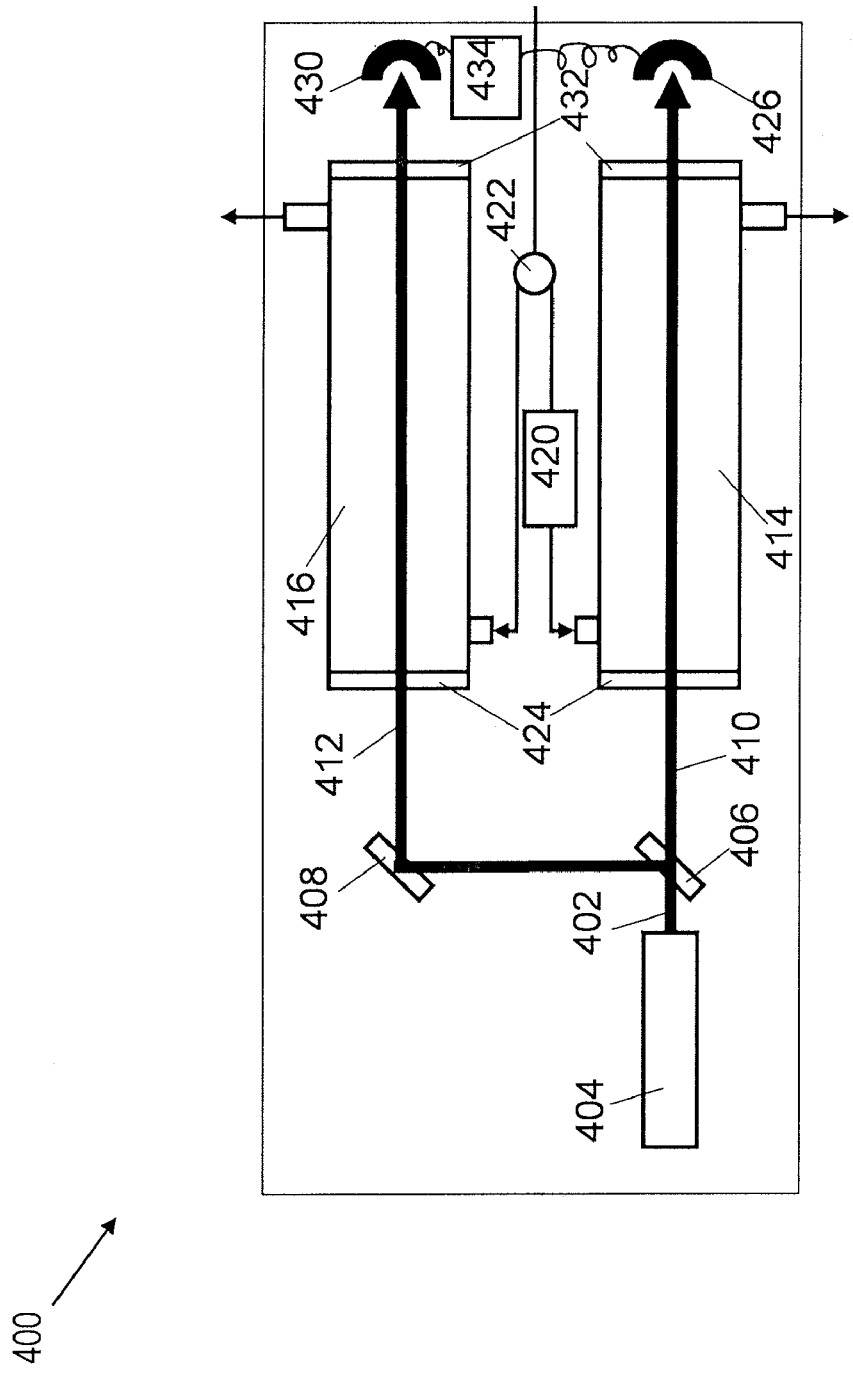

Selective removal of trace analytes can be critically important for very sensitive optical detection of low concentrations of trace analytes in interfering background gas streams, such as for example measurements utilizing tunable diode laser spectroscopy. As noted above, a scrubber unit such as those described herein can be used to remove a reactive gas from background samples used in differential absorption calculations of the reactive gas in a gas mixture. FIG. 3 and FIG. 4 illustrate sample analyzers that can be used to detect and quantify reactive gas concentrations in gas mixtures. FIG. 3 depicts an analyzer 300 with a dual beam arrangement in which the beam 302 from the light source 304 is split by a beam splitter 306 and mirror 308 into a first beam 310 and a second beam 312 that passes through gas held in a first 314 and a second 316 sample cell, respectively. The first sample cell 314 contains a first sample of the gas mixture that is treated to be a background sample as referred to in FIG. 1. The first or background sample can be prepared by removing or reducing the reactive gas concentration using a scrubber unit 320. The second sample cell 316 contains a second sample of the gas mixture that has not been scrubbed. The first beam 310 is directed through the first sample cell 314 and the second beam 312 is directed through the second sample cell 316 which has an identical optical path length to the first sample cell 314. The second sample contains components found in the first sample (e.g. the background sample) in addition to the reactive gas at the concentration present in the gas mixture. In operation, gas flowing into the analyzer 300 is split between the first 314 and the second 316 sample cells. This can be accomplished by a flow divider 322 or other equivalent apparatus for dividing gas flow between two channels. Gas flowing to the second sample cell 316 passes through the scrubber unit 320 that reduces the reactive gas concentration from the gas mixture to produce the first, background sample. Depending on the configuration of the analyzer 300, the incident light can pass through first windows 324 as shown in FIG. 3. The gas in each sample cell can absorb some fraction of the beam intensity, and the first 310 and second 312 light beams then impinge upon a first 326 and a second 330 detector respectively. The first 326 and second 330 detectors can each be a device that quantifies an intensity of light that is incident on a surface or aperture of the detector. In some implementations, the detector 326, 330 can be, photodetectors, including but not limited to an Indium gallium arsenide (InGaAs), indium arsenide (InAs), silicon (Si), or germanium (Ge) photodiode; a mercury-cadmium-telluride (MCT) or lead-sulfide (PbS) photodetector; or another photodetector which is sensitive to light in the 400 to 50000 nm wavelength regions.). Depending on the configuration, the beams can pass through second windows 332 to exit the first and second sample cells. The example illustrated in FIG. 3 depicts the first and second sample cells as single pass configurations in which the beams enter the respective sample cells through first windows 324, pass through the gas contained in each sample cell, and exit the respective sample cells through second windows 332. Other configurations that can include multiple passes of the light beams through the sample cells are also within the scope of the disclosure.

The first detector 326 quantifies the intensity of the first beam impinging upon it, and thus passing through the first sample cell 314, as a function of wavelength. Likewise, the second detector 330 quantifies the intensity of the second beam impinging upon it, and thus passing through the second sample cell 316, as a function of wavelength. In this manner, the first detector 326 quantifies the transmitted intensity for the first sample, in this example the scrubbed background sample, and the second detector 330 quantifies the transmitted intensity for the second sample, which has not been scrubbed. Data from the first detector 326 and the second detector 330 is passed to a control unit 334, such as for example a microprocessor, which records and/or processes data from the detector to generate a differential spectrum from which the reactive gas concentration in the second sample can be calculated. The concentration of the reactive gas is dependent on the mole fraction of reactive gas molecules as well as the temperature and pressure of the gas mixture being measured. As such, the temperature and pressure in the first 314 and second 316 sample cells can be monitored and/or controlled.

To account for detector drift and other potential measurement artifacts, some variations can periodically record an absorption spectrum for each sample cell with no gas to determine the detector's dark current "zero" or to periodically reverse the flows such that the first sample cell 414 is supplied with unscrubbed gas and the second sample cell is supplied with the scrubbed, background sample.

The light source 404 can, in some implementations, operate at a spectrally very narrow wavelength substantially corresponding to a reactive gas absorption line where minimal absorption occurs by the background composition of the gas mixture, thereby minimizing the effects of interference due to the extremely high spectral purity of the laser (narrow line width). The current system can incorporate a laser as its light source, emitting in the wavelength range between 400 nm and 20,000 nm. Tunable diode lasers emitting light within the wavelength range from 400 nm to 3000 nm can be utilized. In addition, quantum cascade lasers (such as those described by J. Faist, F. Carpasso, D. L. Sivco, A. L. Hutchinson, S. N. G. Chu, and A. Y. Cho, Appl. Phys. Lett. 72, 680 (1998), the contents of which are hereby incorporated by reference) emitting light in the wavelength range from 4000 nm to 20,000 nm can also be utilized. Alternately, the spectrally narrow light source can also be constructed by nonlinear difference and sum frequency mixing of suitable lasers. However, nonlinear frequency mixing can be optically complex and too expensive for practical commercial applications. Alternatively, a color center laser can be utilized, but such lasers are not always suitable for use in commercial field instrumentation due to their relatively large physical size, high power consumption, high maintenance requirements, need for cryogenic cooling, and cost.

The light source 404 can optionally be a single frequency diode laser or other light source that emits at the target wavelength and that is scannable over a frequency or wavelength range in which the target wavelength is found. Illustrative examples of target wavelengths are disclosed below. Other wavelengths where the reactive gas molecule has a strong absorption line and the interference absorptions from other gas species in the background composition of the gas mixture, such as for example $CH_4$, $H_2O$ and $CO_2$, are relatively weaker can also be used. Alternatively the light source 404 can optionally be a quantum cascade laser, or the like. In some variations, the wavelength of a tunable diode laser light source 404 can be scanned across the reactive gas absorption feature by varying the injection current while keeping the laser temperature constant. The laser temperature can in some implementations be controlled by placing the laser in intimate contact with a thermoelectric cooler (Peltier cooler) whose temperature is measured with a thermistor and controlled by a feedback circuit.

Due to the removal of the reactive gas in the background sample, the light source 304 can operate at any reactive gas absorption line wavelength between 400 nm and 20,000 nm. In one implementation, lasers in the economically advantageous telecommunications wavelength band between 1500 nm and 1610 nm, including but not limited to 1567 nm, 1569.9 nm, 1574.5 nm, 1576.3 nm, 1578.1 nm, 1581.3 nm, 1582.1 nm, 1589.2 nm, 1589.8 nm, 1590 nm, and 1601.3 nm can be utilized for analysis of $H_2S$. Other potentially advantageous laser wavelengths for use in analysis of hydrogen sulfide include but are not limited to those disclosed in co-pending U.S. application for patent Ser. No. 12/101,890, the disclosure of which is incorporated herein by reference.

Figure 5:
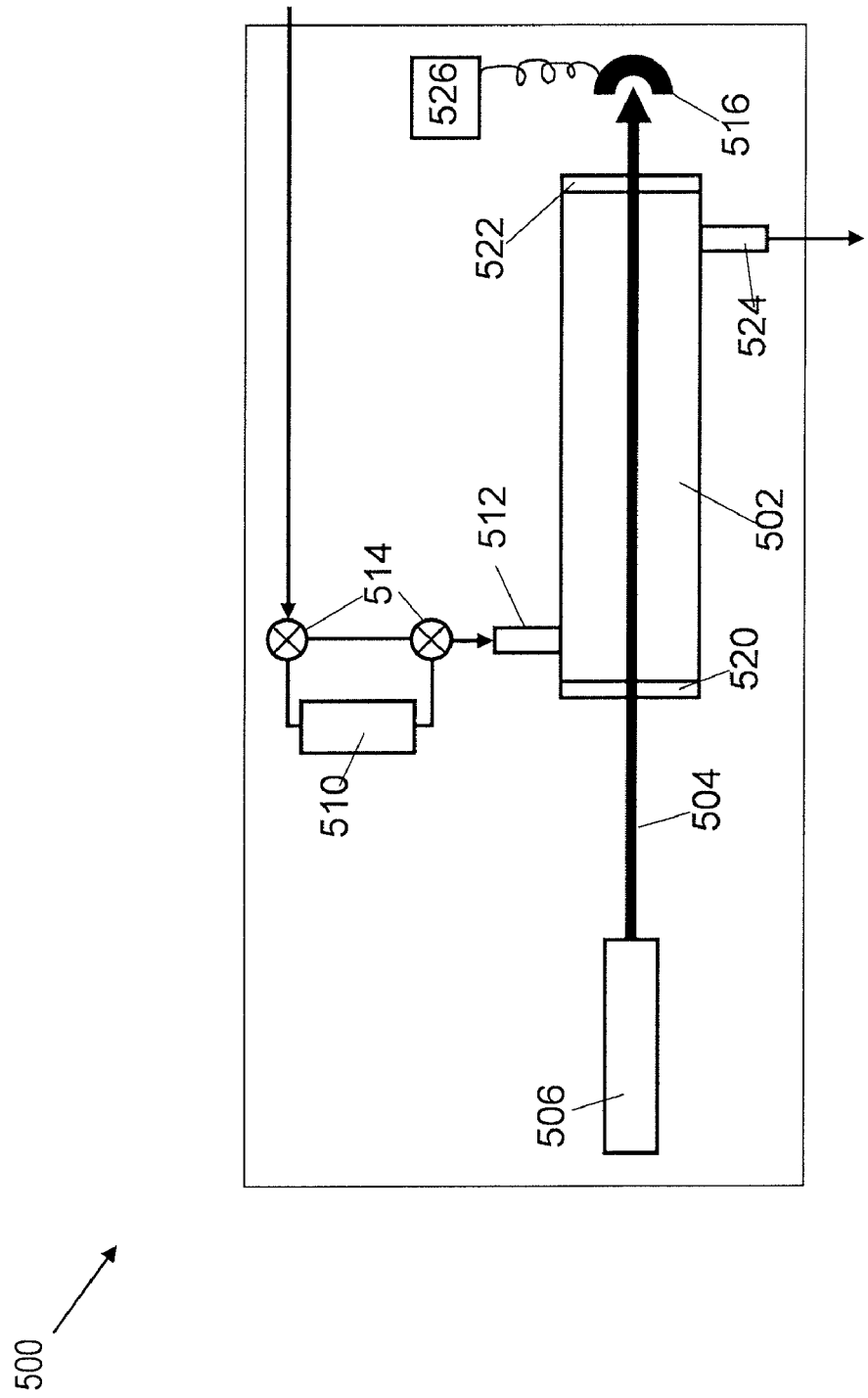

FIG. 5 depicts an analyzer 500 with a single-beam arrangement. A first sample that has been scrubbed and a second, non-scrubbed sample are alternately illuminated by the beam 504 from the light source 506 (which can have the same characteristics as light source 404 in FIG. 4) in a sample cell 502. Spectra are recorded individually for the first sample, which is the scrubbed background sample, and the second sample, which is not scrubbed. For a flow system, this process can be performed continuously, near continuously, and sequentially for multiple samples and multiple background samples which are alternately analyzed in the sample cell 502. The analyzer 500 in FIG. 5 includes a scrubber unit 510 that can be placed in series with the gas inlet 512 to the sample cell 502 by, for example a pair of multi-way valves 514 which can optionally be solenoid valves or pneumatically operated valves. The second sample is not passed through the scrubber unit 510 and as such retains the reactive gas concentration that is present in the gas mixture being measured.

In operation of the analyzer 500 shown in FIG. 5, gas is alternatively conveyed to the sample cell inlet 512 either directly or via the scrubber unit 510 by appropriate operation of the two way valves 514. The detector 516 quantifies the intensity of the beam 404 impinging upon it, and thus passing through the sample cell 502, as a function of wavelength. Thus, when the first sample, which passes through the scrubber unit to reduce its reactive gas concentration, is in the sample cell 502 the detector 516 quantifies the transmitted intensity for the first sample, in this example the scrubbed background or reference gas. The detector 516 quantifies the transmitted intensity for the second sample, containing the original reactive gas concentration, when gas flows directly to the sample cell without passing through the scrubber unit 510. The detector 516 can be one of those described above for detectors 426 and 430. Signals from the detector 516 are passed to a processor 426 that operates similarly to the processor 434 in FIG. 4. As in FIG. 4, light 504 from the light source 506 can pass through the sample cell 502 via windows 520 and 522. Multiple passes of the light 504 in the sample cell can also be used for extending the absorption path length. Gas flows out of the sample cell 502 via an outlet 524.

In other implementations, removal of $H_2S$ can also be important to prevent harmful direct $H_2S$ emission into the environment or sulfur dioxide ($SO_2$) emission resulting from combustion processes. Trace level, for example less than approximately 4 ppmv, detection of $H_2S$ in natural gas streams can be an important application necessary to maintain $H_2S$ tariff levels below 4 ppmv and thus to minimize $SO_2$ emission created by burning of natural gas for power generation and wide spread home heating, cooking etc. Control of $H_2S$ emissions in refinery fuel gases can also be important to maintain $H_2S$ emissions in refinery applications below applicable regulatory limits. Without selective scrubbing of $H_2S$, sensitive detection, such as for example that achieved through differential spectroscopy, can be substantially impaired. Differential spectroscopy operates generally by removing a target compound from a reference gas stream and then measuring absorption of the reference stream as well as that of an unscrubbed gas stream. The two absorption values can be compared to calculate the absorption of the target compound. This technique can be quite useful in, for example refinery fuel gas streams, which can have multiple overlapping background analyte concentrations that can be prone to changing rapidly and randomly.

In other examples and applications, effective removal of HCl can also be important to prevent harmful environmental emissions and also to protect certain, expensive catalysts.

Alkaline (basic) target compounds, such as for example $NH_3$, can also be removed using the current subject matter incorporating a scrubber material that is capable of forming nonvolatile salts or other non volatile chemical compounds with the alkaline reactant. The scrubber material used for removal of such alkaline compounds can include, but is not limited to, clays, such as for example activated acidic alumina, silica, silicon pyrophosphate ($SiP_2O_7$), and silicon orthophosphate ($Si_3(PO_4)_4$); organic acids, such as for example p-toluenesulfonic acid ($C_7H_8O_3S$) and citric acid ($C_6H_8O_7$); and inorganic acids, such as for example phosphorous acid ($H_3PO_3$), phosphoric acid ($H_3PO_4$), and sulfuric acid ($H_2SO_4$). When the scrubber material exists in a non-solid phase, such as for example $H_2SO_4$, $H_3PO_4$, the scrubber material can be adsorbed onto solid carrier particles such as silica, alumina, sand, or halloysite nanoclay. Such carrier particles can have similar dimensions and properties to those described above for supporting metal oxide catalysts. When the scrubber material is solid, it can be used neat or adsorbed onto or otherwise associated with a solid support.

Solid phase acid scrubber particles for use in the removal of ammonia and other alkaline gases from gas mixtures can in some implementations be of similar scale to metal oxide particles used for removal of acid gases. For example, the solid phase acid particles can have aerodynamic diameters of less than approximately 250 nm or alternatively of less than approximately 100 nm. In other implementations, the scrubber material can range from approximately 10 nm to 1 cm in aerodynamic diameter. In other implementations, solid phase acid scrubber particles can be of similar scale to the carrier particles described above, for example in a range of approximately 1 to 10,000 μm or alternatively in a range of approximately 10 to 10,000 μm. In one implementation, a scrubber material can include 20% by weight of $H_3PO_3$ supported on silica carrier particles.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts. Although a few variations have been described in detail above, other modifications are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and described herein do not require the particular order shown, or sequential order, to achieve desirable results. Other embodiments may be within the scope of the following claims.

What is claimed:

1. A method comprising:

maintaining a scrubber medium at a temperature of less than approximately 100° C., the scrubber medium comprising particles of a reactive metal oxide material having first aerodynamic diameters of less than approximately 250 nm adsorbed onto or absorbed into carrier particles having second aerodynamic diameters in a range of approximately 10 to 250 microns, wherein the reactive metal oxide material accounts for approximately 20% to 30% of a total mass of the scrubber medium;

contacting a gas mixture with the scrubber medium, the gas mixture comprising a reactive compound and one or more background compounds, the reactive compound comprising a gas-phase acid or a gas-phase base, the contacting causing the reactive compound to react with the reactive metal oxide material to convert the reactive compound to one or more non-volatile products; and refreshing the scrubber medium by heating the scrubber medium to a temperature above approximately 150° C. and passing an oxidizing gas stream through the scrubber medium to regenerate the scrubber medium by converting the one or more non-volatile products to one or more volatile species.

2. A method as in claim 1, wherein the contacting is maintained for at least approximately one second.

3. A method as in claim 1, wherein the scrubber medium is maintained at a temperature in a range of approximately −20° C. to 85° C.

4. A method as in claim 1, wherein the scrubber medium is maintained at a temperature in a range of approximately −20° C. to 60° C.

5. A method as in claim 1, wherein the contacting comprises:
flowing a first volume of the gas mixture into a scrubber unit that contains the scrubbing medium; and
flowing the first volume out of the scrubber unit, the first volume comprising a substantially reduced concentration of the reactive compound relative to the gas mixture.

6. A method as in claim 5, wherein the flowing is performed at a flow rate that is in a range of approximately 0.1 to 6 SLPM.

7. A method as in claim 5, further comprising:
flowing the scrubbed gas mixture from the scrubber unit to a spectroscopic analysis chamber;
obtaining a first absorbance measurement for the scrubbed gas mixture; and
calculating a differential absorbance measurement from the first absorbance measurement and a second absorbance measurement, the second absorbance measurement being obtained for a second volume of the gas mixture that has not passed through the scrubber unit.

8. A method as in claim 1, wherein the particles of the reactive metal oxide have first aerodynamic diameters of less than approximately 100 nm.

9. A method as in claim 1, wherein the reactive compound comprises one or more of hydrogen sulfide, hydrogen chloride, hydrogen fluoride and ammonia.

10. A method as in claim 1, wherein the carrier particles have second aerodynamic diameters in a range of approximately 10 to 250 microns.

11. A method as in claim 1, wherein the reactive compound is a gas-phase base and the particles of the reactive metal oxide material comprise acid particles that undergo one or more surface reactions with the gas-phase base to form one or more surface complexes on the acid particles.

12. A method as in claim 1, wherein the contacting of the gas mixture with the scrubber medium further comprises passing a flowing stream of the gas mixture through a scrubber chamber containing the particles of the reactive metal oxide material adsorbed onto or absorbed into the carrier particles, wherein the carrier particles reside unattached to other supports in the scrubber chamber and are not entrained into the gas stream due to the second aerodynamic diameter of the carrier particles.

13. A method as in claim 1, wherein the one or more non-volatile products comprise a surface metal-anion complex formed on the particles of the reactive metal oxide material.

14. A method comprising:
contacting a gas mixture with a scrubber medium at a first temperature, that is less than approximately 100° C., the scrubber medium comprising particles of a reactive metal oxide material having first aerodynamic diameters of less than approximately 250 nm adsorbed onto and/or absorbed into carrier particles having second aerodynamic diameters in a range of approximately 10 to 250 microns, wherein the reactive metal oxide material accounts for approximately 20% to 30% of a total mass of the scrubber medium, the gas mixture comprising a reactive compound and one or more background compounds, the reactive compound comprising a gas-phase acid or a gas-phase base, the contacting causing the reactive compound to react with the reactive metal oxide material to convert the reactive compound to one or more non-volatile products; and
refreshing the scrubber medium by heating the scrubber medium to a second temperature that greater than approximately 150° C. and passing an oxidizing gas stream through the scrubber medium to regenerate the scrubber medium by converting the one or more non-volatile products surface metal-anion complexes to one or more volatile species.

15. A method as in claim 14, wherein the one or more non-volatile products comprise a surface metal-anion complex formed on the particles of the reactive metal oxide material.

16. A method as in claim 14, wherein the first temperature is in a range of approximately −20° C. to 85° C.

17. A method as in claim 14, wherein the first temperature is in a range of approximately −20° C. to 60° C.

18. A method comprising:
maintaining a scrubber medium at a first temperature of less than approximately 100° C., the scrubber medium comprising particles of a reactive metal oxide material having first aerodynamic diameters of less than approximately 250 nm that are adsorbed or absorbed onto or into carrier particles having second aerodynamic diameters in a range of approximately 10 to 250 microns;
contacting a gas mixture with the scrubber medium, the gas mixture comprising a reactive compound and one or more background compounds, the contacting causing the reactive compound react with the reactive metal oxide material to convert the reactive compound to one or more nonvolatile products, the reactive compound comprising a gas-phase acid or a gas-phase base; and
refreshing the scrubber medium by heating the scrubber medium to a second temperature that is greater than the first temperature while passing an oxidizing gas stream through the scrubber medium to regenerate the scrubber medium by converting the one or more non-volatile products to one or more volatile species.

* * * * *